Aug. 17, 1965

R. T. NYGREN 3,201,684

DUAL VOLTAGE TRANSFORMER WINDING CONNECTION

Filed Sept. 29, 1961

WITNESSES
John E. Heasly Jr.
Raymond E. Cheers

INVENTOR
Raymond T. Nygren
BY
F. E. Browder
ATTORNEY

Aug. 17, 1965    R. T. NYGREN    3,201,684
DUAL VOLTAGE TRANSFORMER WINDING CONNECTION
Filed Sept. 29, 1961    2 Sheets-Sheet 2

United States Patent Office 3,201,684  
Patented Aug. 17, 1965

3,201,684  
DUAL VOLTAGE TRANSFORMER WINDING CONNECTION  
Raymond T. Nygren, Hickory Township, Mercer County, Pa., assignor to Westinghouse Electric Corporation, East Pittsburgh, Pa., a corporation of Pennsylvania  
Filed Sept. 29, 1961, Ser. No. 141,719  
4 Claims. (Cl. 323—49)

This invention relates in general to transformers and more particularly to protection devices for multi-winding transformers.

Conventionally, dual voltage transformers are provided with fuse links to protect the transformer and load against overloads. The fuse link for one of the two voltages of dual voltage transformers of the prior art is on the line side of the transformer while the other fuse link is on the ground side of the transformer. When the windings are connected in a series circuit arrangement the occurrence of a winding-to-ground fault causes current to flow from the line through one fuse link to the faulted ground thus inducing a current in the shorted portion of the winding causing the fuse on the ground side of the transformer to blow. This, of course, causes the secondary voltage to increase to a dangerous value.

Accordingly, it is the general object of this invention to provide an improved dual voltage transformer winding connection.

It is a more particular object of this invention to provide an improved dual voltage transformer winding connection that gives positive protection in either a parallel circuit or series circuit winding configuration.

Briefly, the present invention accomplishes the above cited objects by placing protective fuse links on the line side of the transformer. When connected in the parallel circuit arrangement one fuse link connects two windings to the line and a second fuse link connects the remaining winding to the line. In the series circuit connection of the transformer winding one fuse link is removed from the circuit and the series connected windings are connected to the line through the other fuse link so that a winding-to-ground fault will blow the fuse and remove the voltage from the series connected windings.

Further objects and advantages of the invention will become apparent as the following description proceeds and features of the novelty which characterize the invention will be pointed out particularly in the claims annexed to and forming a part of this specification.

For a better understanding of the invention, reference may be had to the accompanying drawings, in which.

Figure 1:
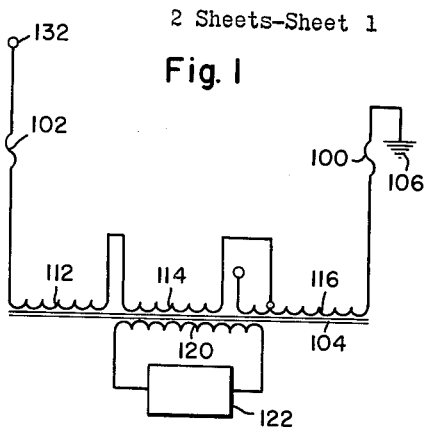
FIG. 1 is a schematic diagram of the prior art transformer connections.

FIGURE 1 shows the location of the fuses in the prior art transformer circuit. The problem with this circuit is in the event of a short circuit to ground in the primary winding, for example, at 104 of winding 116, the current flows through fuse 102, windings 112 and 114 and part of winding 116 to the ground at 104 causing a large induced current in the shorted section of winding 116. The induced current circulates through fuse 100 and the shorted section of winding 116 causing fuse 100 to blow. When fuse 100 blows before fuse 102 the secondary voltage increases to a dangerous value.

Figure 2:
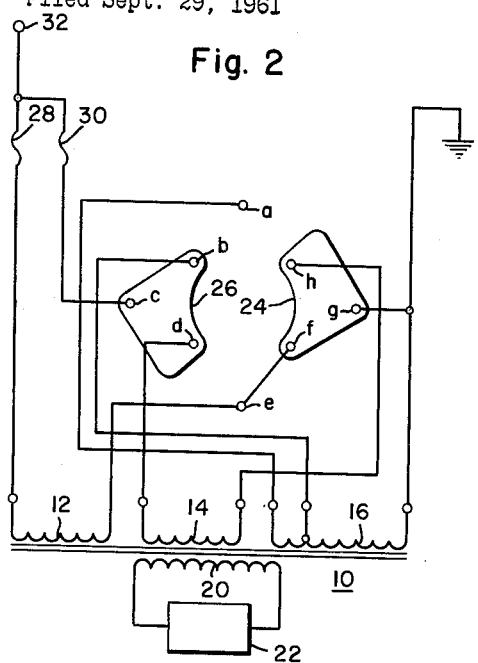
FIG. 2 is a diagrammatic view of a transformer having three primary windings connected in parallel circuit relationship between a voltage source and ground by a switch.

Referring now to FIG. 2, a transformer 10 is shown having a three winding primary 12, 14 and 16 with each winding connected in parallel circuit relationship with the others. The single winding secondary 20 has a load 22 connected across it. The primary windings 12, 14 and 16 are connected in parallel circuit relation by the contact plates 24 and 26 of a switch, shown more completely in FIGS. 6 and 7. The contact plates 24 and 26 connect the transformer windings between the alternating current input or power source, at terminal 32, and ground through two current sensitive protective devices, such as fuses 28 and 30. The transformer 10 is conventionally assembled in a metallic container and the container is grounded.

Figure 3:
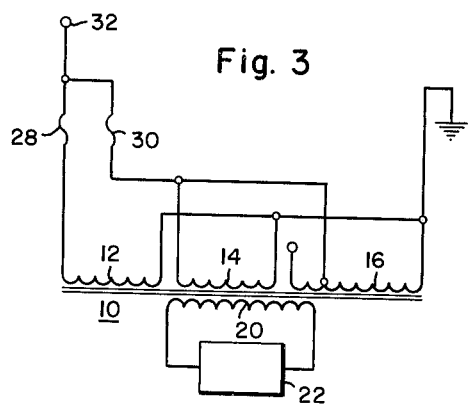
FIG. 3 is a schematic diagram of FIG. 2.

FIG. 3 is a schematic diagram of the parallel connected windings of FIG. 2 with like components having like reference characters.

Figure 4:
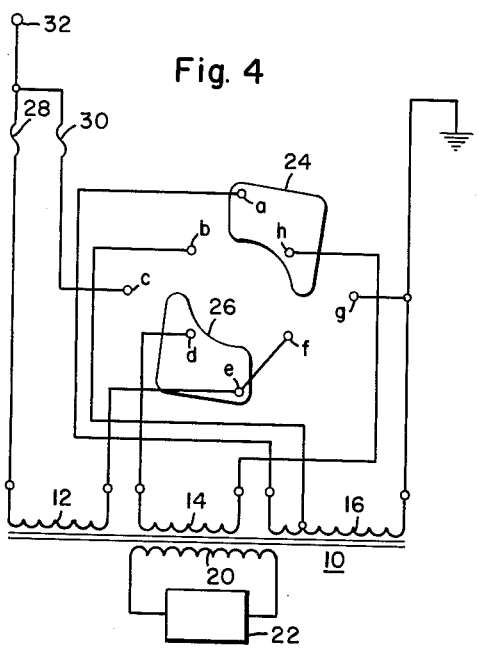
FIG. 4 is a diagrammatic view of the transformer with the three primary windings connected in series circuit relationship by the switch.
Figure 5:
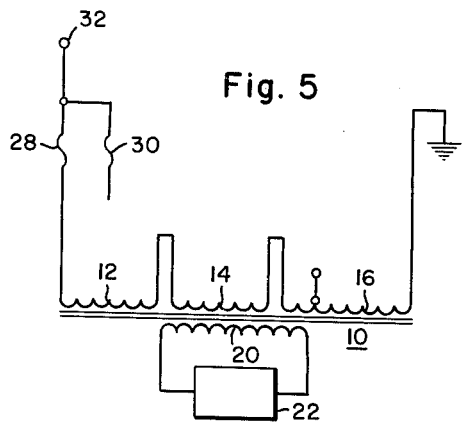
FIG. 5 is a schematic diagram of FIG. 4.

FIGS. 4 and 5 show the transformer windings 12, 14 and 16 connected to series circuit relationship between the alternating current input terminal 32 and ground through the switch contact plates 24 and 26 and the fuse link 28. The contact plates 24 and 26 are in fixed relation with each other and are rotated counterclockwise to change the parallel connected windings, as shown in FIGS. 2 and 3, to the series connected arrangement shown in FIGS. 4 and 5. In the series circuit configuration, as shown in FIGS. 4 and 5, the fuse link 30 is open circuited and the voltage is applied through the single fuse 28 so that any winding-to-ground fault will blow the fuse and remove the voltage from the transformer and load.

Figure 6:
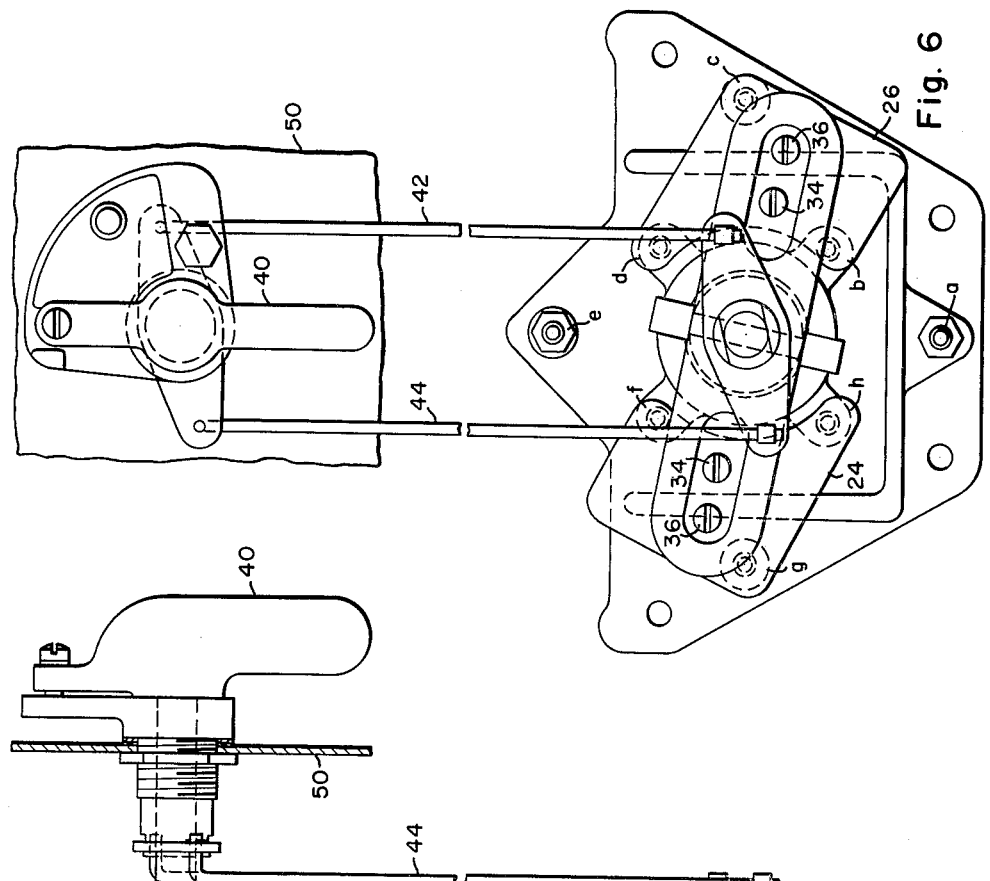
FIG. 6 is a plan view of a switch to change the transformer winding arrangement from series circuit to parallel circuit relationship and vice versa; and, FIG. 7 is a side view of the switch of FIG. 6.

FIG. 6 is a plan view of the switch used to change the windings from the parallel circuit arrangement to the series circuit arrangement and vice versa. The handle 40 is rotated to thereby apply a force to the operating rods 42 and 44 which in turn rotates the contact plates 26 and 24. The contact plates 26 and 24 are in electrical connection with fixed contacts $b$, $c$, and $d$ and $f$, $g$, and $h$, respectively, when the windings are in the parallel circuit arrangement position. The plates 24 and 26 being in fixed relation with each other the operation of the switch handle 40 moves the contact plates 24 and 26 to the series circuit position. That is, the contact plates 24 and 26 are then in electrical connection with fixed contacts $a$ and $h$ and $d$ and $e$, respectively. The switch, as shown in FIG. 6, is in the position which places the transformer windings in parallel circuit relationship. That is, the contact plate 24 is in electrical connection with contacts $f$, $g$ and $h$ and plate 26 is in electrical connection with contacts $b$, $c$ and $d$. The screws 34 are provided to adjust the contact pressure between the contact plates 24 and 26 and the fixed contacts. The screws 36 prevent the plates 24 and 26 from rotating while the adjusting screw 34 is being turned.

Figure 7:
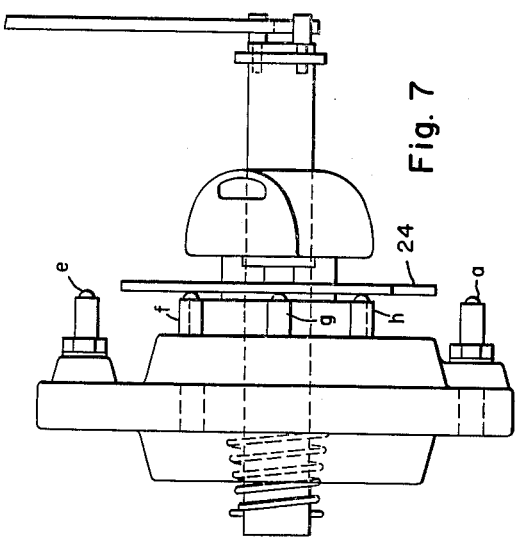

The side view of the switch of FIG. 6, as shown in FIG. 7, shows a section of a transformer tank 50. That is, the switch is contained inside the transformer tank 50 with only the handle 40 extending to the outside of the tank. This, of course, facilitates connection of the transformer windings to the switch contacts.

While there has been shown and described what is at present considered to be the preferred embodiment of this invention, modifications thereto will readily occur to those skilled in the art. It is not desired, therefore, that the invention be limited to the specific arrangement shown and described and it is intended to cover in the appended claims all such modifications as fall within the true spirit and scope of the invention.

I claim as my invention:

1. A dual voltage multi-winding transformer having a plurality of primary windings and a secondary winding, a switch operable to connect the transformer primary windings in a series circuit relationship or a parallel circuit relationship between an alternating current potential and ground, a first and second fuse, said first and second fuses being connected between said plurality of primary windings and said alternating current potential such that said first fuse is connected between said alternating current potential and said plurality of primary windings when said plurality of primary windings are connected in series circuit relationship and both of said first and second fuses are connected between said alternating current potential and said plurality of primary windings when said plurality of primary windings are connected in parallel circuit relationship, said first and second fuse being operable to prevent overvoltage at the secondary winding output on a primary winding-to-ground fault.

2. A dual voltage multi-winding transformer including a plurality of primary windings connected to a source of alternating potential, a plurality of fuses, a switch, said switch being connected between said source of alternating potential and said plurality of primary windings and operable to connect said plurality of primary windings in parallel or series circuit relation with said source of alternating potential, said switch connecting each of said plurality of fuses in circuit relation with at least one of said plurality of primary windings when the plurality of primary windings are connected in a parallel circuit relationship and connecting only one of said plurality of fuses in series with all of said plurality of primary windings when said plurality of primary windings are connected in a series circuit relationship.

3. Dual voltage electrical inductive apparatus having a plurality of primary windings connected to a source of alternating potential and a secondary winding connected to a load circuit, comprising a switching means, said switching means being connected in circuit relation with said plurality of primary windings and operable to connect said plurality of primary windings in series or parallel circuit relation with said source of alternating potential according to whether said source of alternating potential is at the lower or higher voltage of the dual-voltage rating, protective means comprising first and second current sensitive devices, the first current sensitive device of said protective means being connected between said source of alternating potential and said plurality of primary windings when said plurality of primary windings are connected in series circuit relation with said source of alternating potential, the first and second current sensitive devices of said protective means both being connected between said source of alternating potential and said plurality of primary windings when said plurality of primary windings are connected in parallel circuit relation with said source of alternating potential, with the first current sensitive device being responsive to the current in one of said plurality of primary windings and the second current sensitive device being responsive to the current in the remaining plurality of primary windings.

4. A dual-voltage transformer having first, second and third primary windings connected to a source of alternating potential and secondary windings connected to a load circuit, comprising switching means, said switching means being connected in circuit relation with said first, second and third primary windings and operable to connect said first, second and third primary windings in series or parallel circuit relation with said source of alternating potential, protective means comprising first and second current sensitive devices, the first current sensitive device of said protective means being connected between the source of alternating potential and the first, second and third primary windings of said transformer when said first, second and third primary windings are connected in series circuit relation with said source of alternating potential, the first and second current sensitive devices of said protective means both being connected between said source of alternating potential and the first, second and third primary windings of said transformer when said first, second and third primary windings are connected in parallel circuit relation with said source of alternating potential such that the first current sensitive device of said protective means is connected to the first primary winding of said transformer and the second current sensitive device of said protective means is connected to the second and third primary windings of said transformer.

References Cited by the Examiner

UNITED STATES PATENTS

| | | | |
|---|---|---|---|
| 1,774,417 | 8/30 | Burnham | 317—14 X |
| 2,464,061 | 3/49 | Soley | 323—49 X |

LLOYD McCOLLUM, *Primary Examiner.*

ROBERT C. SIMS, *Examiner.*